(12) United States Patent
Wang

(10) Patent No.: US 10,502,893 B2
(45) Date of Patent: Dec. 10, 2019

(54) BACKLIGHT MODULE AND DISPLAY DEVICE

(71) Applicants: BOE Technology Group Co., Ltd., Beijing (CN); BOE Optical Science and Technology Co., Ltd., Suzhou, Jiangsu (CN)

(72) Inventor: Tao Wang, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 16/142,030

(22) Filed: Sep. 26, 2018

(65) Prior Publication Data
US 2019/0212485 A1   Jul. 11, 2019

(30) Foreign Application Priority Data

Jan. 5, 2018 (CN) .................. 2018 2 0023207 U

(51) Int. Cl.
*F21V 15/00* (2015.01)
*F21V 8/00* (2006.01)
*F21V 23/00* (2015.01)
*F21V 17/00* (2006.01)
*F21V 23/06* (2006.01)
*F21Y 105/18* (2016.01)
*F21Y 115/10* (2016.01)

(52) U.S. Cl.
CPC ............ *G02B 6/009* (2013.01); *F21V 17/002* (2013.01); *F21V 23/001* (2013.01); *F21V 23/06* (2013.01); *G02B 6/0083* (2013.01); *F21Y 2105/18* (2016.08); *F21Y 2115/10* (2016.08)

(58) Field of Classification Search
None
See application file for complete search history.

(56) References Cited

U.S. PATENT DOCUMENTS

2011/0242805 A1* 10/2011 Jin ........................... F21K 9/00
362/231
2018/0049318 A1* 2/2018 Maki ........................ F21S 2/00

* cited by examiner

*Primary Examiner* — Vip Patel
(74) *Attorney, Agent, or Firm* — Nath, Goldberg & Meyer; Joshua B. Goldberg

(57) ABSTRACT

The present disclosure provides a backlight module and a display device. The backlight module includes: module substrate provided with a power supply line and a mounting region integrally; and a light emitting source assembly detachably disposed in the mounting region and electrically connected to the power supply line.

17 Claims, 3 Drawing Sheets

BACKLIGHT MODULE AND DISPLAY DEVICE

CROSS-REFERENCE TO RELATED APPLICATION

This application claims priority from Chinese patent application No. 201820023207.4 filed with the China National Intellectual Property Administration on Jan. 5, 2018, the disclosure of which is incorporated herein by reference in its entirety.

TECHNICAL FIELD

The present disclosure relates to the technical field of display technology, and particularly relates to a backlight module and a display device.

BACKGROUND

Backlight modules provide a backlight with a uniform light emission for a display device, and different shapes of display devices require to be configured with different shapes of backlight modules.

Generally, a backlight module is prepared by arranging a plurality of LED lights on a base substrate to form a straight LED strip. In order to prevent the LED strip from being bent to damage a circuit of the LED strip, the longest straight edge among edges of a module substrate of the backlight module is typically selected as an edge close to which the LED strip is placed. However, this usually causes that only the longest straight edge becomes an actual lighting edge in the backlight module, while the rest plurality of edges of the module substrate do not emit light, thus leading to less uniform light emission of the backlight module.

SUMMARY

The present disclosure has been accomplished in order to at least partially solve the problems in related art. The present disclosure provides a backlight module with a uniform light emission and a display device.

According to an aspect of the disclosure, there is provided a backlight module, including:

a module substrate provided with a power supply line and a mounting region integrally; and a light emitting source assembly detachably disposed in the mounting region and electrically connected to the power supply line.

In some embodiments, the mounting region may include a slide rail that is configured to be slidably connected to the light emitting source assembly, and a direction of an arrangement track of at least a portion of the power supply line is the same as a direction of a sliding trace of the slide rail, such that in a case where the light emitting source assembly slides on the slide rail, the light emitting source assembly and the power supply line are electrically connected.

In some embodiments, the power supply line may include a first electrode line and a second electrode line on the module substrate.

In some embodiments, the light emitting source assembly may include a support plate and at least one light source disposed on the support plate.

In some embodiments, a first electrode leg and a second electrode leg may be provided at both ends of the support plate of the light emitting source assembly, and the first electrode leg is electrically connected with the first electrode and the second electrode leg is electrically connected with the second electrode line.

In some embodiments, the slide rail may be a slide groove, and the light emitting source assembly has a leg that is configured to be slidably connected to the slide groove.

In some embodiments, the first electrode line and the second electrode line may be positive and negative power supply lines of the light emitting source assembly.

In some embodiments, the backlight module may further include a light guide plate, the module substrate includes a bottom plate and a peripheral frame vertically disposed on the bottom plate, the light guide plate is located on the bottom plate, and the power supply line and the mounting region are disposed on an inner wall of the peripheral frame.

In some embodiments, the backlight module may be annular, the number of the mounting regions is at least three, and the at least three mounting regions are evenly distributed around an outer periphery of the light guide plate.

In some embodiments, the light source may be an LED light source.

In some embodiments, the mounting region may include a first plug portion, and the light emitting source assembly may include a second plug portion detachably plugged with the first plug portion.

In some embodiments, the first plug portion may include a slot, the light emitting source assembly may include a light emitting body, the second plug portion includes an electrode support end electrically connected to the light emitting body, and the electrode support end is configured to be inserted into the slot.

In some embodiments, the first plug portion may include a slot having a card slot on both sides thereof, the light emitting source assembly may include a light emitting body, the second plug portion includes a chuck at both ends of the light emitting body, and the chuck is configured to be inserted into the card slot, and the electrode support end electrically connected to the light emitting body is electrically connected with the power supply line.

In some embodiments, the first plug portion may include a slot having a chuck on both sides thereof, the light emitting source assembly may include a light emitting body, the second plug portion includes a card slot at both ends of the light emitting body, and the chuck is configured to be inserted into the card slot, and the electrode support end electrically connected to the light emitting body is electrically connected with the power supply line.

In some embodiments, the module substrate may include a bottom plate and a peripheral frame vertically disposed on the bottom plate, and the first plug portion and the second plug portion are configured to be plugged in a direction perpendicular to an inner wall of the peripheral frame.

In some embodiments, the light emitting source assembly may include a support plate and at least one light source disposed on the support plate, and the second plug portion is on the support plate.

According to an aspect of the disclosure, there is provided a display device including the above backlight module.

BRIEF DESCRIPTION OF DRAWINGS

Various other advantages and benefits will become apparent to those ordinary skilled in the art from reading the following detailed description of preferred embodiments. The drawings are only for the purpose of illustrating the preferred embodiments and are not to be construed as limiting thereto. Throughout the drawings, the same reference numbers represent the same components. In the drawings.

DETAILED DESCRIPTION

To improve understanding of technical solutions of the present disclosure for those skilled in the art, specific implementations, structures, features and functions of the backlight module and the display device provided in the disclosure will now be described in detail in conjunction with the accompanying drawings and preferred embodiments. In the following description, specific features, structures, or characteristics in one or more embodiments may be combined in any suitable form.

Figure 1:
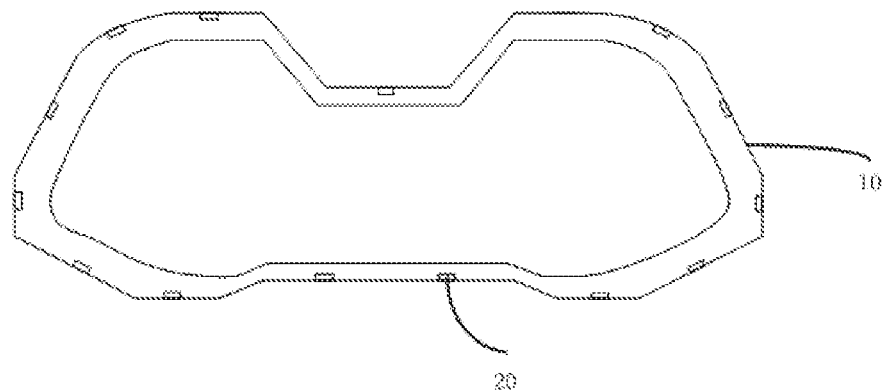
FIG. 1 is a schematic view showing an overall configuration of a backlight module according to the disclosure.

FIG. 1 is a schematic view showing an overall configuration of a backlight module according to the disclosure. As shown in FIG. 1, according to an aspect of the disclosure, the present disclosure provides a backlight module including a module substrate 10 and a light emitting source assembly 20. A power supply line for supplying power to the light emitting source assembly 20 is disposed on the module substrate 10. Such configurations do not have the problem with, for example, damages to an LED strip due to the bending of the LED strip in related art. Therefore, the light emitting source assembly 20 of the disclosure may be disposed on a plurality of edges of the module substrate 10 so as to obtain a backlight module with uniform light emission.

Figure 2:
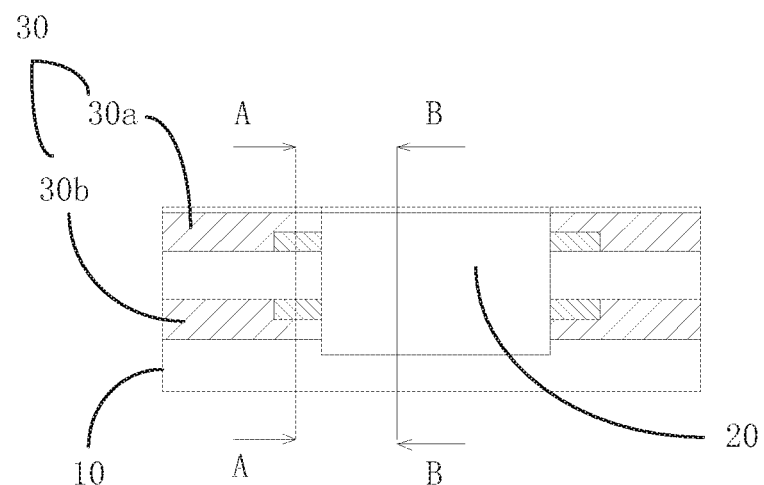
FIG. 2 is a partial structural schematic view of a backlight module according to the first exemplary embodiment of the disclosure.
Figure 3:
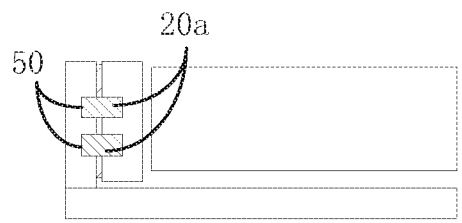
FIG. 3 is a partial cross-sectional view taken along line A-A of FIG. 2.
Figure 4:
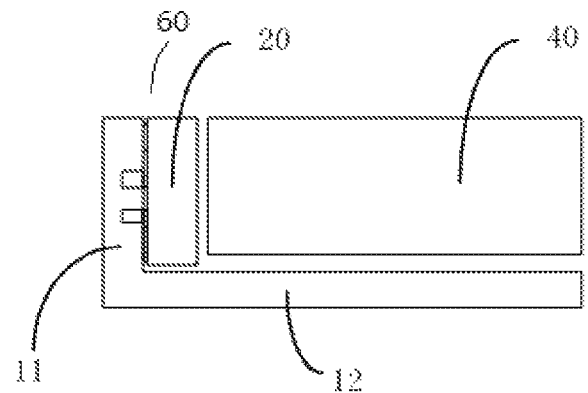
FIG. 4 is a partial cross-sectional view taken along line B-B of FIG. 2.

FIGS. 2 to 4 are partial structural schematic views of a backlight module according to the first exemplary embodiment of the disclosure. As shown in FIGS. 2 to 4, the backlight module provided in the first exemplary embodiment of the disclosure includes a module substrate 10 and a light emitting source assembly 20. The module substrate 10 is provided with a power supply line 30 and a mounting region 60 integrally. The light emitting source assembly 20 is detachably disposed in the mounting region 60, and electrically connected to the power supply line 30.

In this exemplary embodiment, the power supply line 30 may be arranged on an outer surface of the module substrate 10 by a printing process. The position of the mounting region 60 may be determined according to a position of the light emitting source assembly 20 to be provided, and then the light emitting source assembly 20 is mounted on the module substrate 10. Different from the case where a circuit of the LED strip is separately provided in related art, the power supply line 30 of the disclosure is directly integrated on the module substrate 10. Thus, the light emitting source assembly 20 may be disposed on a plurality of edges of the module substrate 10 conveniently, so as to make the backlight module emit light uniformly.

As shown in FIG. 4, the backlight module further includes a light guide plate 40. The module substrate 10 includes a bottom plate 12 and a peripheral frame 11 vertically disposed on the bottom plate 12. The light guide plate 40 may be located on the bottom plate 12. The power supply line 30 and the mounting region 60 are disposed on an inner wall of the peripheral frame 11. The light emitting source assembly 20 emits light to the light guide plate 40, and may be implemented as an LED light source or the like. For example, in an annular backlight module, the number of the mounting regions 60 is at least three, and the at least three mounting regions 60 are distributed around an outer periphery of the light guide plate 40. For example, for uniform light emission, the at least three mounting regions 60 are evenly distributed around an outer periphery of the light guide plate 40. In addition, the number of the light emitting source assemblies 20 is also at least three, which are respectively disposed in different mounting regions 60. That is, the light emitting source assemblies 20 are also distributed around the outer periphery of the light guide plate 40. The number of the light emitting source assemblies 20 and the mounting regions 60 may depend on a perimeter of the backlight module. A light emitting source assembly 20 is disposed in each of the plurality of mounting regions 60 of the peripheral frame 11 of the backlight module, so as to obtain the backlight module with uniform light emission.

Figure 5:
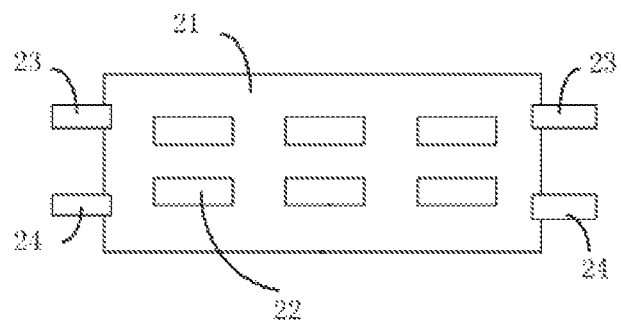
FIG. 5 is a structural schematic view of a light emitting source assembly of the backlight module according to the first exemplary embodiment of the disclosure.
Figure 6:
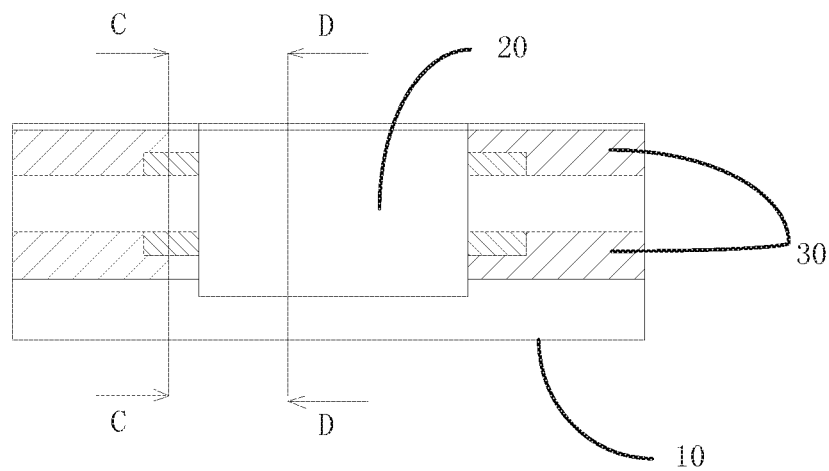
FIG. 6 is a partial structural schematic view of another backlight module according to the second exemplary embodiment of the disclosure.
Figure 7:
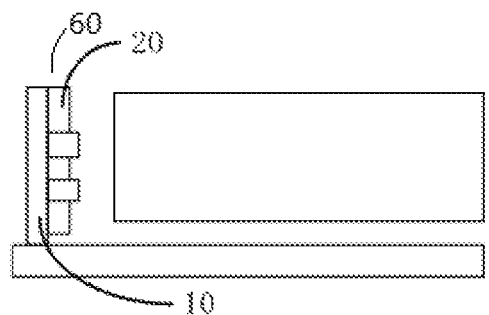
FIG. 7 is a partial cross-sectional view taken along line C-C of FIG. 6.
Figure 8:
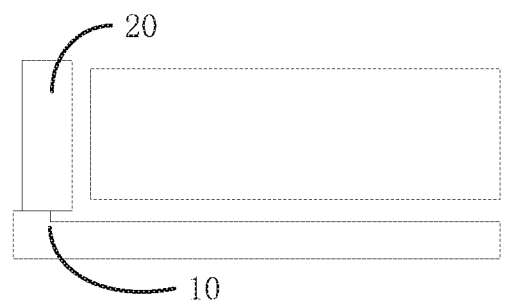
FIG. 8 is a partial cross-sectional view taken along line D-D of FIG. 6.

FIG. 5 is a structural schematic view of a light emitting source assembly of the backlight module according to the first exemplary embodiment of the disclosure. In the exemplary embodiment, the light emitting source assembly 20 may be a single LED light source, each single LED light source being disposed in a different mounting region 60, respectively. However, the present disclosure is not limited thereto. That is, the light emitting source assembly 20 of the disclosure is not limited to a single LED light source. As shown in FIG. 5, the light emitting source assembly 20 includes a support plate 21 and at least one LED light source 22 disposed on the support plate 21. For example, six LED light sources 22 are shown in FIG. 5. For a long linear light emitting region on the peripheral frame, one light emitting source assembly 20 may be provided with a plurality of LED light sources, which may be mounted in one mounting region 60 at a time, thereby improving the assembly efficiency.

In the backlight module provided in the exemplary embodiment, the light emitting source assembly 20 is configured to be slidably connected to the mounting region 60 so that a position of the light emitting source assembly 20 may be easily adjusted, and thus a light emitting position of the light emitting source assembly 20 may be adjusted freely as needed.

As shown in FIGS. 2 and 3, the backlight module provided in the first exemplary embodiment of the disclosure includes a module substrate 10 and a light emitting source assembly 20. The module substrate 10 is provided with a power supply line 30 and a mounting region 60 integrally. The light emitting source assembly 20 is detachably disposed in the mounting region 60 and electrically connected to the power supply line 30, and the mounting region 60 includes a slide rail 50 configured to be slidably connected to the light emitting source assembly 20, wherein a direction of an arrangement track of at least a portion of the power supply line 30 is the same as a direction of a sliding trace of the slide rail 50, such that when the light emitting source assembly 20 slides on the slide rail 50, the light emitting source assembly 20 and the power supply line 30 are kept electrically connected. In this manner, a position of the light emitting source assembly 20 on the module substrate 10 is adjustable so that a light emitting position of the light emitting source assembly 20 may be adjusted freely as needed.

In the exemplary embodiment, the slide rail 50 may be in the form of a slid groove, a T-shaped convex rail, or in other forms as long as the slide rail 50 enables movement of the light emitting source assembly 20. In the case where the slide rail 50 is in the form of a slide groove, the light emitting source assembly 20 has a leg 20a that is configured to be slidably connected into the slide groove.

In the exemplary embodiment, the power supply line 30 includes a first electrode line 30a and a second electrode line 30b printed on the module substrate 10. The first electrode line 30a and the second electrode line 30b may serve as positive and negative power supply lines of the light emitting source assembly 20, respectively. The lines printed on the module substrate 10 may be determined according to the specific requirements of the backlight module, and the number of the lines is not limited to only two. It is easy to be understood that the printed lines may be set freely as needed.

The light emitting source assembly 20 may be provided with at least one LED light source therein, and each light emitting source assembly 20 only needs to be arranged with two electrode legs to energize the LED light source. In the exemplary embodiment, in order to realize a stable electrical connection of the light emitting source assembly 20 on the slide rail 50 during sliding, as shown in FIG. 5, a first electrode leg 23 and a second electrode leg 24 are disposed at both ends of the support plate 21 of the light emitting source assembly 20. The first electrode legs 23 on two sides of the support plate 21 are electrically connected to the first electrode line 30a, respectively, and the second electrode legs 24 on two sides of the support plate 21 are electrically connected to the second electrode line 30b, respectively.

In the backlight module provided in the exemplary embodiment, the light emitting source assembly 20 of the disclosure may be disposed on a plurality of edges of the module substrate 10 so as to obtain a backlight module with uniform light emission. The light emitting source assembly 20 is detachably connected to the mounting region 60, which facilitates disassembly and assembly of the light emitting source assembly 20 on the module substrate 10 for further maintenance. The light emitting source assembly 20 may be moved by a certain distance so that an optimum screen display effect is achieved.

Figure 9:
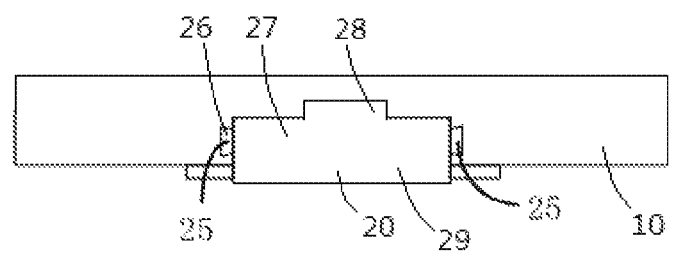
FIG. 9 is a schematic plan view showing a partial structure of another backlight module according to the second exemplary embodiment of the disclosure.

FIGS. 6 to 9 are partial structural schematic views of another backlight module according to the second exemplary embodiment of the disclosure. As shown in FIGS. 6 to 9, the backlight module provided in the second exemplary embodiment of the disclosure includes a module substrate 10 and a light emitting source assembly 20. The module substrate 10 is provided with a power supply line 30 and a mounting region 60. The light emitting source assembly 20 is detachably disposed in the mounting region 60, and electrically connected to the power supply line 30. In the exemplary embodiment, as shown in FIG. 9, the mounting region 60 includes a first plug portion, and the light emitting source assembly 20 includes a second plug portion detachably plugged with the first plug portion, thus facilitating disassembly and assembly of the light emitting source assembly 20 on the module substrate 10 for further maintenance.

As in the first exemplary embodiment, the mounting region 60 may be disposed on a peripheral frame of the module substrate 10, for example, on an inner wall of the peripheral frame, and the first plug portion and the second plug portion are plugged in a direction perpendicular to the inner wall of the peripheral frame, where "perpendicular" may be interpreted as a substantially perpendicular direction. In other embodiments, the mounting region 60 may also be opened from a top surface of the peripheral frame, and the first plug portion and the second plug portion are plugged in a direction parallel to the inner wall of the peripheral frame, where "parallel" may be interpreted as a substantially parallel direction.

It should be understood that the first plug portion may be in the form of a plug and the second plug portion may be in the form of a slot. Alternatively, the first portion may be in the form of a slot and the second plug portion may be in the form of a plug. In the exemplary embodiment, as shown in FIG. 9, the first plug portion is a slot 27, the light emitting source assembly 20 includes a light emitting body 29, and the second plug portion is an electrode support end 28 electrically connected to the light emitting body 29 and inserted into the slot 27. The electrode support end 28 is a necessary part of the light emitting source assembly 20, and may be used as a plug portion, which is low in cost.

In a variation, as shown in FIG. 9, the first plug portion is a slot 27 having a card slot 26 on both sides thereof. The light emitting source assembly 20 includes a light emitting body 29, and the second plug portion is a chuck 25 located at two sides (or two ends) of the light emitting body 29. The chuck 25 is plugged into the card slot 26, and the electrode support end 28 electrically connected to the light emitting body 29 is electrically connected to the power supply line 30. The light emitting body 29 is provided with a chuck 25 at two sides, and the slot 27 is provided with a card slot 26 at two sides. The chuck 25 is inserted into the card slot 26 to firmly insert the light emitting source assembly 20 into the slot 27.

It should be understood that the second plug portion may be the electrode support end 28, the chuck 25 or a combination thereof, and shapes and positions of the first and second plug portions are not limited to the shapes and positions as shown in FIG. 9, but may be set freely according to actual applications.

In the backlight module provided in the exemplary embodiment, the light emitting source assembly 20 may be disposed on a plurality of edges of the module substrate 10 so as to obtain a backlight module with uniform light emission. The light emitting source assembly 20 is detachably connected to the mounting region 60, which facilitates disassembly and assembly of the light emitting source assembly 20 on the module substrate 10 for further maintenance.

According to another aspect of the disclosure, the disclosure provides a display device including any one of the backlight modules in the above exemplary embodiments.

The display device may be a display panel, an electronic paper, a mobile phone, a tablet PC, a television, a monitor, a notebook computer, a digital album, a navigator or any other product or component having a display function.

In the display device of the disclosure, the light emitting source assembly 20 of the backlight module can be disposed on a plurality of edges of the module substrate 10 conveniently, thus obtaining a backlight module, and thereby a display device, with uniform light emission.

In the above exemplary embodiments, descriptions of the various exemplary embodiments are focused differently, and portions that are not detailed in certain exemplary embodiments may be referred to related descriptions of in other exemplary embodiments.

In addition, "first", "second", and the like in the above described exemplary embodiments are used to distinguish respective exemplary embodiments, and do not represent advantages and disadvantages of the respective exemplary embodiments.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A backlight module, comprising:
a module substrate provided with a power supply line and a mounting region integrally; and
a light emitting source assembly detachably disposed in the mounting region and electrically connected to the power supply line.

2. The backlight module of claim 1, wherein
the mounting region includes a slide rail that is configured to be slidably connected to the light emitting source assembly, and
a direction of an arrangement track of at least a portion of the power supply line is the same as a direction of a sliding trace of the slide rail, such that in a case where the light emitting source assembly slides on the slide rail, the light emitting source assembly and the power supply line are electrically connected.

3. The backlight module of claim 2, wherein
the power supply line includes a first electrode line and a second electrode line on the module substrate.

4. The backlight module of claim 3, wherein
the light emitting source assembly includes a support plate and at least one light source disposed on the support plate.

5. The backlight module of claim 4, wherein
a first electrode leg and a second electrode leg are provided at both ends of the support plate of the light emitting source assembly, and
the first electrode leg is electrically connected with the first electrode line, and the second electrode leg is electrically connected with the second electrode line.

6. The backlight module of claim 2, wherein
the slide rail is a slide groove, and
the light emitting source assembly has a leg that is configured to be slidably connected to the slide groove.

7. The backlight module of claim 3, wherein
the first electrode line and the second electrode line are positive and negative power supply lines of the light emitting source assembly.

8. The backlight module of claim 1, further comprising a light guide plate, wherein
the module substrate includes a bottom plate and a peripheral frame vertically disposed on the bottom plate, the light guide plate is located on the bottom plate, and the power supply line and the mounting region are disposed on an inner wall of the peripheral frame.

9. The backlight module of claim 8, wherein
the backlight module is annular, the number of the mounting regions is at least three, and the at least three mounting regions are evenly distributed around an outer periphery of the light guide plate.

10. The backlight module of claim 4, wherein
the light source is a LED light source.

11. The backlight module of claim 1, wherein
the mounting region includes a first plug portion, and
the light emitting source assembly includes a second plug portion detachably plugged with the first plug portion.

12. The backlight module of claim 11, wherein
the first plug portion includes a slot,
the light emitting source assembly includes a light emitting body, the second plug portion includes an electrode support end electrically connected to the light emitting body, and
the electrode support end is configured to be inserted into the slot.

13. The backlight module of claim 11, wherein
the first plug portion includes a slot having a card slot on both sides thereof,
the light emitting source assembly includes a light emitting body, the second plug portion includes a chuck at both ends of the light emitting body, and
the chuck is configured to be inserted into the card slot, and the electrode support end electrically connected to the light emitting body is electrically connected with the power supply line.

14. The backlight module of claim 11, wherein
the first plug portion includes a slot having a chuck on both sides thereof,
the light emitting source assembly includes a light emitting body, the second plug portion includes a card slot at both ends of the light emitting body, and
the chuck is configured to be inserted into the card slot, and the electrode support end electrically connected to the light emitting body is electrically connected with the power supply line.

15. The backlight module of claim 11, wherein
the module substrate includes a bottom plate and a peripheral frame vertically disposed on the bottom plate, and the first plug portion and the second plug portion are configured to be plugged in a direction perpendicular to an inner wall of the peripheral frame.

16. The backlight module of claim 11, wherein
the light emitting source assembly includes a support plate and at least one light source disposed on the support plate, and the second plug portion is on the support plate.

17. A display device, comprising:
the backlight module of claim 1.

* * * * *